United States Patent [19]
Jobe

[11] 3,808,523
[45] Apr. 30, 1974

[54] CONDUCTIVITY MONITOR
[75] Inventor: John D. Jobe, Deer Park, Tex.
[73] Assignee: Shell Oil Company, Houston, Tex.
[22] Filed: Nov. 15, 1972
[21] Appl. No.: 306,951

[52] U.S. Cl.............................................. 324/30 R
[51] Int. Cl...................... G01n 27/02, G01n 27/46
[58] Field of Search............ 324/30 B, 30 R, 64, 62

[56] References Cited
UNITED STATES PATENTS
| 3,593,119 | 7/1971 | Brum et al. | 324/30 |
| 3,470,465 | 9/1969 | Wuschke | 324/30 |
| 2,757,334 | 7/1956 | Potter | 324/30 |

FOREIGN PATENTS OR APPLICATIONS
| 480,542 | 2/1938 | Great Britain | 324/30 B |
| 982,290 | 2/1965 | Great Britain | 324/30 |

OTHER PUBLICATIONS
Mueller, et al. "High Sensitivity, Direct Reading, Linear Recording Conductometric Tritrator," Analytical Chemistry, Jan. 1965, Vol. 37 No. 1, pp. 13–29.

Primary Examiner—Alfred E. Smith
Assistant Examiner—Rolf Hille

[57] ABSTRACT

A portable monitor for determining the electrical conductivity of a continuously flowing stream such as a liquid hydrocarbon treated with an antistatic material. The monitor utilizes a conductivity cell containing opposed planar electrodes while the associated power supply and amplifier are enclosed within an explosion proof case. The construction of the cell is such that a precise value for the cell constant is determined. The interelectrode separation is adjustable permitting various cell constants to be used. The conductivity measurement is not susceptible to leakage currents caused by normal contamination of insulator surfaces.

6 Claims, 3 Drawing Figures

3,808,523

CONDUCTIVITY MONITOR

BACKGROUND OF THE INVENTION

The present invention relates to conductivity meters and particularly to a conductivity meter that is designed to continuously monitor the conductivity of a flowing stream of hydrocarbons. Conductivity as mentioned herein refers to the electrical conductivity commonly defined as specific conductance. In the handling of purified hydrocarbons such as jet fuel for aircraft, gasolines, diesel fuel, or furnace oil, considerable static electricity can be generated as the fuel flows through the various parts of the fuel handling system such as filters. In the case of aircraft, for example, the fuel passes through several filters to insure both its cleanliness and the absence of water in the fuel. If steps are not taken to improve the conductivity of the fuel, discharges of the static electricity can cause fires and explosions. In order to decrease the danger from static electricity discharges steps may be taken to improve conductivity of jet fuel by adding various substances. It therefore becomes very desirable to have a continuous conductivity measurement as the conductivity of the jet fuel may fall below safe operating levels.

In the past, various conductivity devices have been used in an attempt to determine the conductivity of a hydrocarbon fuel. These devices have been of the probe type wherein the probe is lowered into the hydrocarbon fuel and its conductivity determined. These devices are not of the flow-through type which constantly monitor the fuel. Further, these devices have in many instances been susceptible to the problem of conducting material accumulating on the electrode insulators resulting in erroneous readings of conductivity. Additionally, the devices require calibration in that the cell constant is determined indirectly by observing the current through a standard material. The standard material is usually an aqueous solution of an electrolyte and hence has electrical characteristics much different from hydrocarbons. In particular, the exact configuration of the fringe electric field in the vicinity of electrode boundaries may be different in aqueous and hydrocarbon media, and the cell constant may not show the required inverse proportionality to cell current regardless of constant cell geometry.

BRIEF SUMMARY OF THE INVENTION

The present invention solves the above problems by providing a conductivity monitor with a flow-through conductivity cell for continuously monitoring the conductivity of a fuel such as jet fuel. Preferably, the monitor is disposed to sample a portion of the flow through a main fuel line which sample may be under pressure. The conductivity cell consists of a housing having planar electrodes with parallel faces of equal surface area disposed within. The input electrode is connected to the input of a sensitive operational amplifier and the source electrode is connected to a voltage source such as a power supply or a battery. Both electrodes are insulated from the cell housing which is grounded.

The conductivity cell in the present invention is constructed so that the electrode separation is adjustable. This is an important feature in that it allows the determination of a unique cell constant and removes the need for calibrating with a sample of known conductivity. The cell constant in the present invention is given by the electrode separation divided by the area of an electrode face provided all current leaving the source electrode face arrives at the input electrode. This can be verified in the present invention by varying the electrode separation in a hydrocarbon sample of constant conductivity while keeping the source electrode voltage constant. An inverse proprtionality between the interelectrode current and interelectrode spacing then justifies the use of a cell constant computed from the interelectrode spacing and electrode face area.

The input electrode is coupled to an operational amplifier which is provided with a feedback circuit so that the voltage between the input to the operational amplifier and ground remains substantially zero. The input electrode insulator is therefore not particularly sensitive to an accumulation of conductive impurities as long as the leakage resistance of the electrode does not become substantially lower than the feedback resistance. Further, leakage current from the source electrode across the source electrode insulation goes to ground and does not contribute to the current flow to the input electrode. Thus, the conductivity measurement is not affected by normal accumulation of conductive impurities on insulator surfaces.

The voltage applied to the source electrode may be changed to provide different conductivity measuring ranges. Further this electrode may be grounded. When the source electrode is grounded with sample flowing through the cell the output of the monitor should be zero. If an output is obtained, different from zero, electric charges are contained in the sample flowing to the conductivity cell. The monitor will sense such charges in addition to the normal flow of charges which constitute the conductivity current. If it is not desired to monitor the electric charges contained in the sample flowing to the cell, then these charges must be eliminated by providing long metal sample lines that are grounded, thus allowing these charges to dissipate to ground.

BRIEF DESCRIPTION OF THE DRAWINGS

The above invention will be more easily understood from the following detailed description of a preferred embodiment when taken in conjunction with the attached drawings in which.

PREFERRED EMBODIMENT

Figure 1:
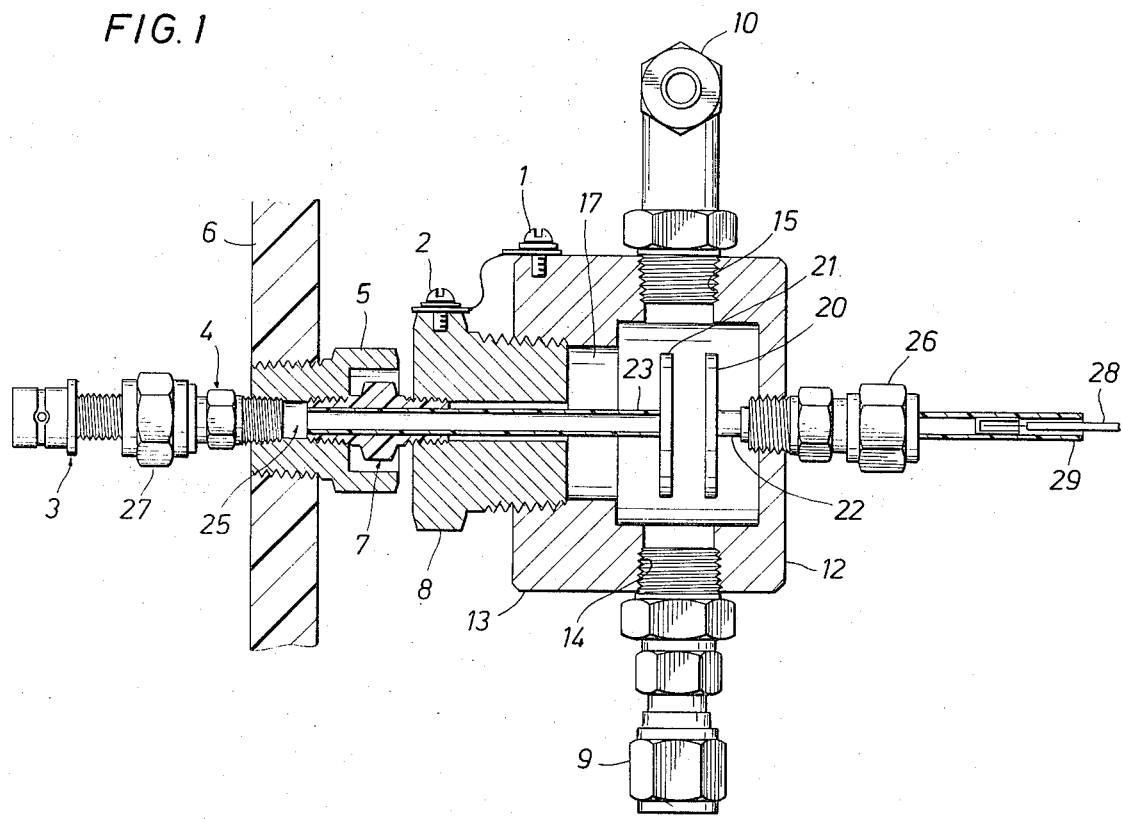
FIG. 1 is an elevation view of the conductivity monitor sample cell shown partly in section.
Figure 2:
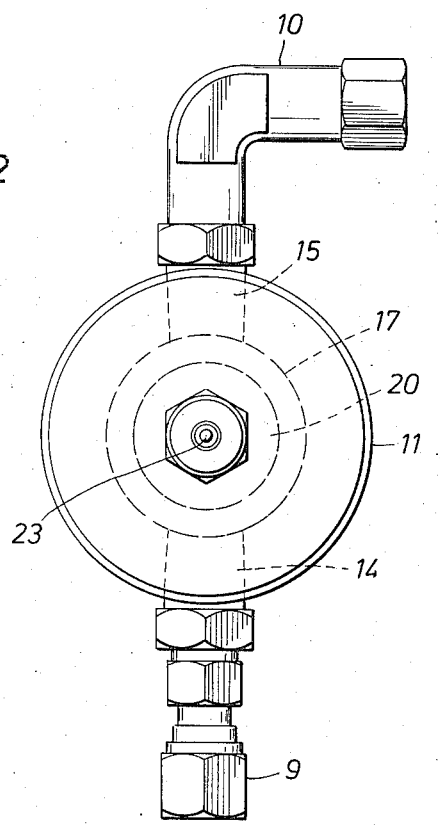
FIG. 2 is an end view of the sample cell shown in FIG. 1.

Referring now to FIGS. 1 and 2, the construction details of the sample cell used in the present monitor are shown. More particularly, the sample cell assembly shown has a housing 11 having a general cylindrical shape with flat end walls 12 and 13. An inlet opening 14 is provided in one side of the cylinder while an outlet opening 15 is located diametrically opposite the inlet. Fittings 9 and 10 connect to suitable sample lines. The internal volume of the cylinder is made relatively large compared to the cross-sectional area of the inlet and outlet openings to insure a relatively low flow rate of the sample past the electrodes of the cell. The end wall 13 is provided with a relatively large opening 17 in order that the electrodes may be installed in the cell. All parts of the sample cell assembly are preferably stainless steel except insulating material which is preferably fluorocarbon plastic.

The electrode plates 20 and 21 have a general circular or disc shape and are mounted perpindecularly to the ends of supporting members 22 and 23 respectively. The supporting members are positioned within insulating sleeves 24 and 25 that are mounted within suitable fittings and seals contained inside fittings 26 and 27. The electrode surfaces thus disposed are precisely parallel. As can be seen in FIG. 1, the opening 17 is larger than the diameter of the electrodes so that the source electrode 20 and its supporting member can be inserted into the cell and the fitting and seal 26 installed. The assembly comprising input electrode 21, connector 3, fittings 4,5,7,8,27 and sleeve 25 is assembled and this assembly is then installed in cell body opening 17 by screwing in fitting 8. Fluorocarbon plastic tape is used on the pipe fitting seat between 8 and 17 and a lead connecting terminal posts 1 and 2 guarantees electrical continuity. The entire assembly as shown in FIG. 1 is attached to explosion proof housing wall 6 by means of fitting 5. Alternately, the sample cell assembly may be located remotely from the wall 6 by simply using a longer shielded cable to communicate the signal from the connector 3 to the input of the amplifier described further in reference to FIG. 3. The distance between opposing faces of electrodes 20 and 21 is adjusted by means of a spacer gauge which is inserted between these faces by insertion through opening 15 after fittings 10 have been removed. The nut on fitting 26 is loosened releasing pressure on the seal contained therein and allowing electrode 20 and rod 22 to be moved until desired spacing is obtained. Fitting 26 is then tightened fixing the desired spacing. Alternately, the extension 28 of supporting member 22 is calibrated with visible marks such that by reference to a fixed point such as the end 29 of sleeve 24 the spacing between electrode surfaces may be determined.

Figure 3:
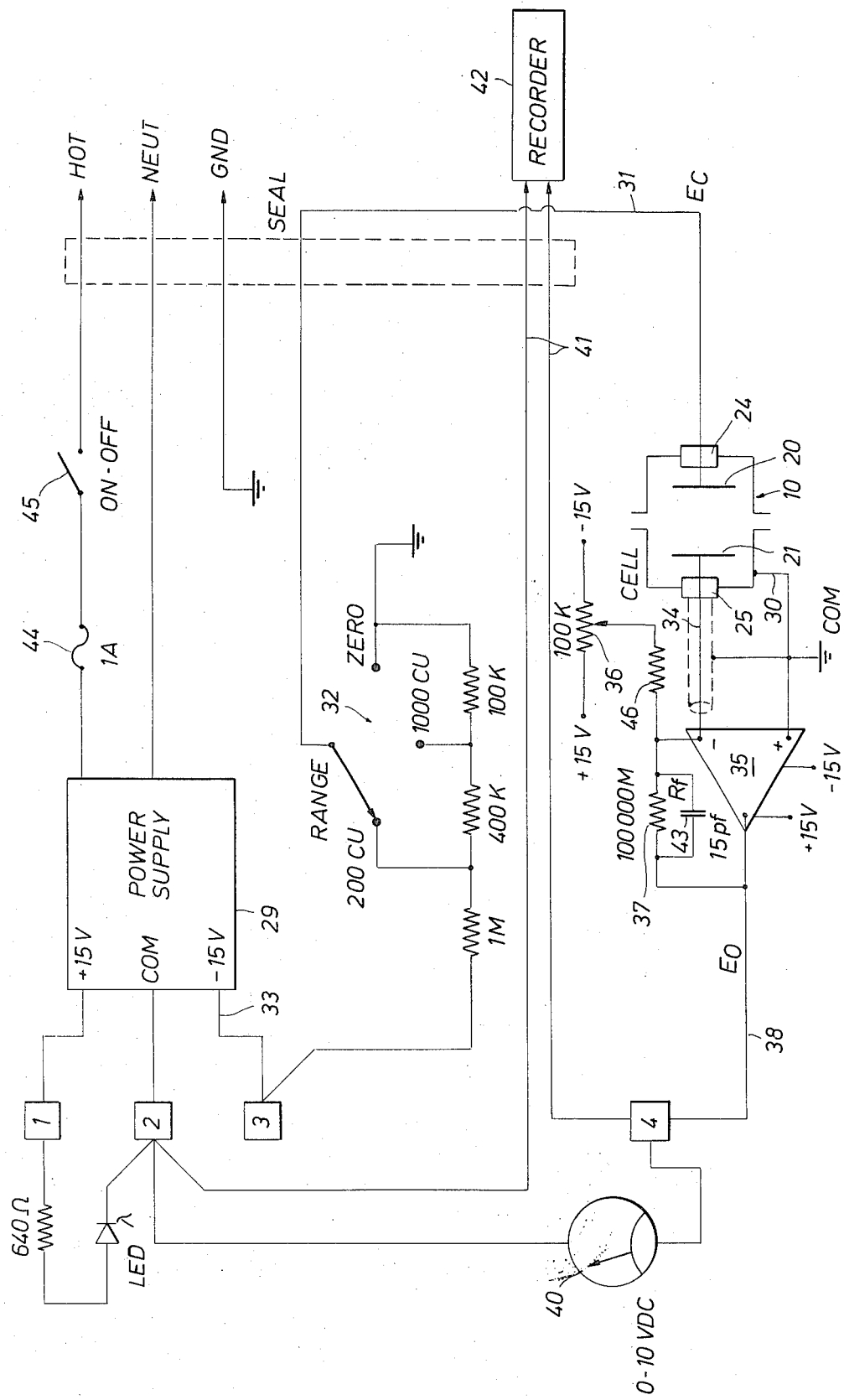
FIG. 3 is a schematic drawing of the circuit utilized with a sample cell shown in FIGS. 1 and 2.

Referring now to FIG. 3 there is shown a schematic drawing of the circuit used with the sample cell described above. More particularly, the cylindrical housing 11 of the sample cell is connected by a lead 30 to ground while the source electrode 20 is coupled by lead 31 to the range changing circuit 32. The range changing circuit consists of resistances which may be coupled in series between the source electrode 20 and the lead 33 of the power supply. By selecting the proper resistance, the range of the instrument may be varied. A connection is also provided for grounding the source electrode 20 so that the monitor output may be adjusted to a zero position. The input electrode 21 of the cell is coupled by means of a shielded lead 34 to one input terminal of an operational amplifier 35 while the other input terminal of the operational amplifier is grounded. The operational amplifier is provided with a variable resistor 36 and a fixed resistor 46 for zeroing the circuit when electrode 20 is connected to ground. The amplifier is also provided with the feedback circuit consisting of the feedback resistor 37 and capacitance 43. The current through the feedback circuit substantially balances the input signal. Thus there is substantially zero potential between the two terminals to the operational amplifier. As explained above, this insures that the amplifier only measures the current flowing between the two electrodes of the sample cell and is not sensitive to a reduction of the resistance of input electrode insulation 25 caused by normal accumulation of foreign material. Further, any reduction in the resistance of the source electrode insulator 24 caused by any normal accumulation of foreign material will not appreciably affect the voltage on the source electrode 20. The arrangement of the electrode insulators therefore allows the conductivity monitor to measure changes in the conductivity of the fuel without being affected by dirt accumulating on the electrode insulators. This is an important feature since it eliminates the need for periodic dismantling and cleaning of the cell to insure that the electrode insulators remain clean and free of foreign matter.

The output from the operational amplifier is supplied by means of a lead 38 to a meter 40 and by means of leads 41 to a recorder 42. One may visually observe the conductivity of the fuel flowing through the cell on the meter as well as make a permanent record of the conductivity.

The output of the above described conductivity monitor may be calibrated in terms of conductivity by considering the following: By definition, the conductivity or specific conductance of a material is inversely proportional to the net resistance of a volume of the material contained between planar electrodes of unit area separated by a distance of one unit. As is well known in the state of the art, if the face area of electrodes 20 and 21 is A square units and the separation between electrodes 20 and 21 is adjusted as described above to $l$ units, then the constant of proportionality between resistance and conductivity is called the cell constant K and is given by the ratio of $l$ to A. It follows that the cell resistance Rc is related to conductivity $\gamma$ by $$Rc = l/A\gamma.$$

It is also well known that the output voltage $E_o$ of an amplifier disposed such as amplifier 35 is related to the source voltage input $E_c$, the feedback resistance $R_f$, and cell resistance $R_c$ such that $E_o = - R_f/R_c \, E_c$. It therefore follows that the output voltage measured on meter 40 or display 42 is proportional to the conductivity with the proportionality constant given by $$- R_f \, AE_c/l$$

The known values of feedback resistance, electrode face area, source voltage, and electrode spacing may then be used to determine the relation between output voltage and conductivity. For example, if the feedback resistance is $10^{11}$ ohms, the electrode area is 5 square centimeters, the source voltage is $-1$ volt, and the electrode spacing has been adjusted to 0.5 centimeters, then a conductivity of $10^{-11}$ ohm$^{-1}$cm$^{-1}$ will cause a 10 volt output signal to appear on meter 40.

The above described conductivity monitor is operated by coupling the inlet and outlet of the sample cell to a bypass means such as a sample loop in the main fuel supply line. Also, the power supply 29 is coupled to a suitable source of power through fuse 44 and switch 45. The output can then be zeroed by putting the range circuit 32 in the zero position and adjusting the zero balance resistance 36 to obtain a zero reading on the meter 40. The cell can then be switched to an operating position by selecting the proper position on the range circuit 32. The amplifier 34 will then measure the change in resistivity between the two electrodes resulting from changes in the conductivity of the fuel flowing through the cell.

I claim as my invention:

1. A portable monitor for continuously sampling and determining the conductivity of a flowing stream, said monitor comprising:

a closed sample cell formed of electrical conducting material, said sample cell having an inlet and an outlet positioned directly opposite each other to produce a straight flow through said sample cell, the internal volume of said cell being large compared to the cross-sectional area of the inlet and outlet openings, said inlet and outlet being adapted to be coupled in a fluid tight manner to said fluid stream;

a pair of plate electrodes, said electrodes being mounted on opposite sides of said sample cell with the surfaces of said plates being parallel to each other and the axis of the flow through said cell;

a pair of mounting means disposed in opposite sides of said sample cell, said mounting means in addition being insulated from said sample cell, said mounting means being effectively sealed against sample leakage from said sample cell, said plate electrodes being attached to the ends of said mounting means that extend to said cell;

a direct current power supply, one terminal of said power supply being coupled to one of said mounting means, the other terminal of said power being grounded;

circuit means for measuring the resistance between said plate electrodes, said circuit means having two input terminals, one of said input terminals being coupled to the other of said mounting means and the other of said input terminals being coupled to ground and said sample cell; and a display means coupled to said circuit means for displaying the change in said measured resistance.

2. The monitor of claim 1 wherein said plate electrodes are disc shaped and of equal areas.

3. The monitor of claim 2 wherein at least one of the mounting means is adjustable so that the separation distance between said plate electrodes is adjustable.

4. The monitor of claim 1 and in addition a recording means coupled to the output of said circuit means to read the change in resistance.

5. The monitor of claim 1 wherein said sample cell has a cylindrical shape with said inlet and outlet being positioned on diametrically opposite sides of said cylinder and said pair of mounting means are disposed in opposite ends of said cylinder.

6. The monitor of claim 1 wherein said circuit means includes an operational amplifier having a feedback circuit that maintains the signal between said one input terminal and ground at substantially zero potential.

* * * * *